(12) United States Patent
Gulick, Jr. et al.

(10) Patent No.: US 11,337,074 B2
(45) Date of Patent: *May 17, 2022

(54) MOBILE DEVICE MANAGEMENT METHOD

(71) Applicant: Scorpion Security Products, Inc., Vestal, NY (US)

(72) Inventors: Franklyn W. Gulick, Jr., Vestal, NY (US); Grant William Gulick, Endwell, NY (US); Anuj Thakral, Vestel, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,136

(22) Filed: Jun. 11, 2020

(65) Prior Publication Data

US 2020/0322806 A1 Oct. 8, 2020

Related U.S. Application Data

(63) Continuation of application No. 16/485,050, filed as application No. PCT/US2018/018914 on Feb. 21, 2018, now Pat. No. 10,708,785.

(Continued)

(51) Int. Cl.
*H04W 12/30* (2021.01)
*H04W 12/126* (2021.01)
(Continued)

(52) U.S. Cl.
CPC ............ *H04W 12/126* (2021.01); *G08B 7/06* (2013.01); *H04L 43/10* (2013.01); *H04W 4/021* (2013.01);
(Continued)

(58) Field of Classification Search
CPC ............ H04W 12/1206; H04W 4/021; H04W 48/10; H04W 4/029; H04W 12/002;
(Continued)

(56) References Cited

U.S. PATENT DOCUMENTS

| 4,851,815 A | 7/1989 | Enkelmann |
| 5,151,684 A | 9/1992 | Johnsen |
| 5,438,319 A | 8/1995 | Zeytoonjian |
| 5,552,773 A | 9/1996 | Kuhnert |

(Continued)

FOREIGN PATENT DOCUMENTS

| AU | 2012254998 A1 | 12/2013 |
| CA | 2636293 A1 | 8/2007 |

(Continued)

OTHER PUBLICATIONS

National Intellectual Property Administration, P.R. China, Second Office Action and Search Report, Application No. 201880025942.1, dated Mar. 3, 2021, (5 pages).

(Continued)

*Primary Examiner* — Chuong A Ngo
(74) *Attorney, Agent, or Firm* — Barclay Damon LLP

(57) ABSTRACT

A method for mobile device security of a mobile device. The mobile device includes a global positioning system (GPS) tracker for locating the mobile device. A first zone and a second zone are established in a monitoring area. The mobile device is maintained in a first operating mode when the mobile device is located in the first zone and a second operating mode when the mobile device is located in the second zone. One or more characteristics of the first zone are received from a management system. Upon the mobile device being located outside the first zone for longer than a predetermined time period, one or more first actions are performed. Upon the mobile device returning to the first zone, one or more second actions are performed.

19 Claims, 9 Drawing Sheets

Related U.S. Application Data

(60) Provisional application No. 62/578,232, filed on Oct. 27, 2017, provisional application No. 62/461,448, filed on Feb. 21, 2017.

(51) Int. Cl.

| | | |
|---|---|---|
| *H04W 4/029* | (2018.01) | |
| *G08B 7/06* | (2006.01) | |
| *H04L 43/10* | (2022.01) | |
| *H04W 4/021* | (2018.01) | |
| *H04W 48/10* | (2009.01) | |

(52) U.S. Cl.
CPC ........... *H04W 4/029* (2018.02); *H04W 12/30* (2021.01); *H04W 48/10* (2013.01)

(58) Field of Classification Search
CPC ..... H04W 12/126; H04W 12/30; H04W 4/35; H04W 4/80; H04W 48/02; G08B 7/06; G08B 13/1427; G08B 21/0277; H04L 43/10; H04L 67/18; H04L 67/12
See application file for complete search history.

(56) References Cited

U.S. PATENT DOCUMENTS

| | | |
|---|---|---|
| 6,907,254 B1 | 6/2005 | Westfield |
| 7,218,226 B2 | 5/2007 | Wehrenberg |
| 7,490,720 B2 | 2/2009 | Cole et al. |
| 7,498,985 B1 | 3/2009 | Woo |
| 7,548,161 B2 | 6/2009 | Wehrenberg |
| 7,561,102 B2 | 7/2009 | Duvall |
| 7,696,887 B1 | 4/2010 | Echavarria |
| 7,714,265 B2 | 5/2010 | Fadell et al. |
| 7,986,233 B2 | 7/2011 | Wehrenberg |
| 8,018,329 B2 | 9/2011 | Morgan et al. |
| 8,217,792 B2 | 7/2012 | Wehrenberg |
| 8,242,910 B2 | 8/2012 | Skjellerup |
| 8,279,077 B1 | 10/2012 | Liff et al. |
| 8,378,823 B2 | 2/2013 | Eckert et al. |
| 8,472,203 B2 | 6/2013 | Dabov et al. |
| 8,531,296 B2 | 9/2013 | Wehrenberg |
| 8,536,507 B2 | 9/2013 | Fadell et al. |
| 8,539,590 B2 | 9/2013 | Lee et al. |
| 8,558,714 B1 | 10/2013 | Liff et al. |
| 8,587,662 B1 | 11/2013 | Moll |
| 8,626,187 B2 | 1/2014 | Grosman et al. |
| 8,712,432 B2 | 4/2014 | Loveland |
| 8,717,172 B2 | 5/2014 | Parker et al. |
| 8,745,383 B2 | 6/2014 | Tarkhanyan et al. |
| 8,829,414 B2 | 9/2014 | Fadell et al. |
| 8,878,672 B2 | 11/2014 | Parker et al. |
| 8,878,673 B2 | 11/2014 | Grant |
| 8,902,066 B2 | 12/2014 | Parker et al. |
| 8,913,400 B2 | 12/2014 | Werner et al. |
| 8,988,898 B2 | 3/2015 | Villarreal et al. |
| 9,048,124 B2 | 6/2015 | Dolci et al. |
| 9,105,899 B2 | 8/2015 | Pakula et al. |
| 9,113,300 B2 | 8/2015 | Marti et al. |
| 9,167,381 B2 | 10/2015 | McDonald et al. |
| 9,173,061 B2 | 10/2015 | Varoglu et al. |
| 9,179,538 B2 | 11/2015 | Foster et al. |
| 9,191,832 B2 | 11/2015 | Marti et al. |
| 9,210,545 B2 | 12/2015 | Sabatelli et al. |
| 9,215,559 B2 | 12/2015 | Dave et al. |
| 9,215,833 B2 | 12/2015 | Dolci et al. |
| 9,223,345 B2 | 12/2015 | Dabov et al. |
| 9,247,377 B2 | 1/2016 | Pai et al. |
| 9,298,954 B1 | 3/2016 | Ewing |
| 9,307,358 B2 | 4/2016 | Marti et al. |
| 9,318,018 B2 | 4/2016 | Park et al. |
| 9,373,236 B2 | 6/2016 | Oehl et al. |
| 9,400,321 B2 | 7/2016 | Huang et al. |
| 9,432,807 B2 | 8/2016 | Kern, Jr. et al. |
| 9,445,235 B2 | 9/2016 | Marti et al. |
| 9,495,318 B2 | 11/2016 | Balkan et al. |
| 9,525,771 B2 | 12/2016 | Marti et al. |
| 9,560,481 B1 | 1/2017 | Yocam et al. |
| 9,600,049 B2 | 3/2017 | Pham et al. |
| 9,706,032 B2 | 7/2017 | Pai et al. |
| 9,743,234 B2 | 8/2017 | Varoglu et al. |
| 9,749,797 B2 | 8/2017 | Marti et al. |
| 9,749,800 B2 | 8/2017 | Bansal et al. |
| 9,858,777 B2 | 1/2018 | Dandie et al. |
| 9,894,196 B2 | 2/2018 | Marti et al. |
| 10,002,505 B1 | 6/2018 | Grant et al. |
| 10,080,103 B2 | 9/2018 | Kazemi et al. |
| 10,103,934 B2 | 10/2018 | Pai et al. |
| 10,217,337 B1 | 2/2019 | Marszalek et al. |
| 10,218,835 B2 | 2/2019 | Marti et al. |
| 10,223,553 B2 | 3/2019 | Snediker et al. |
| 10,340,711 B2 | 7/2019 | Graham et al. |
| 10,395,068 B2 | 8/2019 | Belk et al. |
| 10,447,839 B2 | 10/2019 | Pai et al. |
| 10,462,284 B2 | 10/2019 | Marti et al. |
| 10,645,534 B1 | 5/2020 | Klinkner |
| 10,708,785 B2 | 7/2020 | Gulick, Jr. et al. |
| 10,715,380 B2 | 7/2020 | Pai et al. |
| 10,736,246 B2 | 8/2020 | Lee et al. |
| 2003/0063003 A1 | 4/2003 | Bero |
| 2004/0233042 A1 | 11/2004 | Piccoli |
| 2004/0263327 A1 | 12/2004 | Hayes et al. |
| 2005/0017855 A1 | 1/2005 | Harvey |
| 2005/0091553 A1 | 4/2005 | Chien |
| 2006/0026797 A1 | 2/2006 | Coyle |
| 2006/0267575 A1 | 11/2006 | Sampson |
| 2007/0035391 A1 | 2/2007 | Hamzy |
| 2007/0182555 A1 | 8/2007 | Walker |
| 2008/0083982 A1 | 4/2008 | Kelley et al. |
| 2008/0125965 A1 | 5/2008 | Carani |
| 2008/0143516 A1 | 6/2008 | Mock |
| 2008/0204239 A1 | 8/2008 | Marszalek |
| 2008/0291044 A1 | 11/2008 | Chan |
| 2010/0148947 A1 | 6/2010 | Morgan et al. |
| 2010/0275267 A1 | 10/2010 | Walker |
| 2010/0277322 A1 | 11/2010 | Eckert |
| 2011/0149078 A1 | 6/2011 | Fan |
| 2011/0232585 A1 | 9/2011 | Rich |
| 2012/0094769 A1 | 4/2012 | Nguyen |
| 2012/0139723 A1 | 6/2012 | Avila |
| 2012/0293330 A1 | 11/2012 | Grant et al. |
| 2013/0017840 A1 | 1/2013 | Moeglein |
| 2013/0065648 A1 | 3/2013 | Kim |
| 2013/0080289 A1 | 3/2013 | Roy |
| 2013/0169434 A1 | 7/2013 | McCown et al. |
| 2013/0257616 A1 | 10/2013 | Taylor et al. |
| 2013/0307692 A1 | 11/2013 | Fawcett et al. |
| 2013/0321159 A1 | 12/2013 | Schofield |
| 2014/0062695 A1 | 3/2014 | Rosen |
| 2014/0118145 A1 | 5/2014 | Wawrzyniak et al. |
| 2014/0351098 A1 | 11/2014 | Shafer |
| 2015/0009034 A1 | 1/2015 | Grant et al. |
| 2015/0091729 A1 | 4/2015 | Phillips et al. |
| 2015/0348146 A1 | 12/2015 | Shanmugam et al. |
| 2015/0365796 A1 | 12/2015 | Toni |
| 2016/0142532 A1* | 5/2016 | Bostick ................ H04L 63/083 455/411 |
| 2016/0307209 A1 | 10/2016 | Marszalek |
| 2016/0307415 A1 | 10/2016 | Marszalek et al. |
| 2016/0307416 A1 | 10/2016 | Marszalek et al. |
| 2016/0308952 A1 | 10/2016 | Marszalek et al. |
| 2017/0048665 A1 | 2/2017 | Yocam et al. |
| 2017/0092087 A1 | 3/2017 | Grant et al. |
| 2017/0099577 A1 | 4/2017 | Yocam et al. |
| 2017/0301198 A1 | 10/2017 | Grant et al. |
| 2018/0293856 A1 | 10/2018 | Grant et al. |
| 2018/0349651 A1 | 12/2018 | Snediker |
| 2019/0364492 A1* | 11/2019 | Azizi ..................... H04W 48/16 |
| 2020/0051410 A1 | 2/2020 | Grant et al. |

FOREIGN PATENT DOCUMENTS

| | | |
|---|---|---|
| CA | 2 911 794 A1 | 10/2016 |
| CA | 2 912 891 A1 | 10/2016 |

(56) References Cited

FOREIGN PATENT DOCUMENTS

| | | |
|---|---|---|
| DE | 198 22 670.5 A1 | 11/1999 |
| DE | 198 22 670 A1 | 11/1999 |
| DE | 10 2013 017245 A1 | 4/2014 |
| EP | 2710567 A1 | 3/2014 |
| EP | 3082091 A1 | 10/2016 |
| EP | 3093815 A1 | 11/2016 |
| GB | 2 137 391 B | 3/1984 |
| GB | 2 205 426 A | 9/1987 |
| WO | 2007/115097 A2 | 10/2007 |
| WO | 2010/127293 A1 | 11/2010 |
| WO | 2012159102 A1 | 11/2012 |
| WO | 2013/163333 A2 | 10/2013 |
| WO | 2014/107184 A2 | 7/2014 |
| WO | 2016/167968 A1 | 10/2016 |
| WO | 2016/167969 A1 | 10/2016 |

OTHER PUBLICATIONS

Chinese National Intellectual Property Administration, First Office Action and Search Report, Appl. No. 201880025942.1, dated Aug. 3, 2020 (15 pages).

European Patent Office, Supplementary European Search Report, Application No. EP 18756989, Date of Completion: Jul. 7, 2020, dated Nov. 6, 2020 (5 pages).

International Preliminary Report On Patentability, Int. Appl. No. PCT/US2010/033243, Applicant: Checkpoint Systems, Inc.; filed Apr. 30, 2010; dated Nov. 1, 2011 (8 pages).

EP Search Report, Appl. No. 15200006.3, dated Oct. 18, 2016, Sennco Solutions, Inc. (9 pages).

ISR/Written Opinion, Int. Appl. No. PCT/US16/25036, Applicant: Sennco Solutions, LLC; filed Mar. 30, 2016, date of completion May 25, 2016 (7 pages).

ISR/Written Opinion, Int. Appl. No. PCT/US16/25032, Applicant: Sennco Solutions, LLC; filed Mar. 30, 2016, date of completion May 28, 2016 (7 pages).

ISR/Written Opinion, Int. Appl.No. PCT/US18/018914, Applicant: Scorpion Security Products, Inc. filed Feb. 21, 2018, date of completion Apr. 3, 2018 (12 pages).

Partial Supplementary EP Search Report, Appl. No. 18756989.2, dated Jul. 16, 2020, (20 pages).

National Intellectual Property Administration, P.R. China, Third Office Action and Search Report, Application No. 201880025942.1, dated Aug. 24, 2021, (10 pages).

International Searching Authority, International Search Report and Written Opinion, International Application No. PCT/US2021/042332, dated Oct. 19, 2021, (136 pages).

\* cited by examiner

MOBILE DEVICE MANAGEMENT METHOD

CROSS-REFERENCE TO RELATED APPLICATIONS

This application is a continuation of U.S. patent application Ser. No. 16/485,050, filed Aug. 9, 2019, which is the National Stage of International Application No. PCT/US18/18914, filed Feb. 21, 2018, which claims priority to U.S. Provisional Patent Application Ser. No. 62/461,448, filed Feb. 21, 2017, and U.S. Provisional Patent Application Ser. No. 62/578,232, filed Oct. 27, 2017, each of which is incorporated herein by reference in its entirety.

TECHNICAL FIELD

The invention relates to a security system for managing mobile devices, such as handheld electronic devices displayed in a retail store.

BACKGROUND

Retailers sell handheld electronic devices to the public in a range of shapes and sizes, with a range of functionality. Encouraging customers to examine and use the functionality of the devices at display locations is a valuable marketing technique employed by retailers. To decrease the risk of theft associated with this marketing strategy, retailers employ various security measures.

One common security measure is the use of an alarm sensor that sets when placed in contact with the surface of the handheld electronic device and activates when it loses contact with the device (e.g., when the sensor is removed). A typical alarm sensor is attached to one portion of the handheld electronic device using an adhesive tape or similar adhesive product. During use, the adhesives often fail, resulting in the alarm sensor losing contact with the handheld electronic device and causing alarms to sound and startle innocent customers, negatively affecting their shopping experience. When these false alarms occur at a high frequency, retailers tend to ignore the alarms or even turn them off to avoid disrupting customer shopping experiences, leaving retailers vulnerable to theft. Furthermore, these alarm sensors are only activated when the alarm sensor loses contact with the portion of the handheld electronic devices to which it has been attached. For example, if the alarm sensor is attached to the battery cover of a wireless phone, a thief can remove and steal the remainder of the wireless phone (i.e., all components but the battery cover) without activating the alarm sensor. In order to combat this, retailers often install a plurality of alarm sensors in multiple locations on the handheld electronic devices (e.g., front and back, inside the battery compartment, etc.). These alarm sensors often hinder customer inspection of the device. In some cases, these alarm sensors installed within the handheld electronic devices can ignite when subjected to excessive heat within the devices.

SUMMARY

A method for mobile device security of a mobile device. The mobile device includes a global positioning system (GPS) tracker for locating the mobile device. A first zone and a second zone are established in a monitoring area. The mobile device is maintained in a first operating mode when the mobile device is located in the first zone and a second operating mode when the mobile device is located in the second zone. One or more characteristics of the first zone are received from a management system. Upon the mobile device being located outside the first zone for longer than a predetermined time period, one or more first actions are performed. Upon the mobile device returning to the first zone, one or more second actions are performed.

In another aspect, a method for mobile device security of a plurality of mobile devices is presented. Each specific mobile device of the plurality of mobile devices includes a global positioning system (GPS) tracker for locating the mobile device. A first zone with first characteristics and a second zone with second characteristics are established in a monitoring area. The plurality of mobile devices are maintained in a first operating mode when the specific mobile device is located in the first zone and a second operating mode when the specific mobile device is located in the second zone. One or more updated characteristics of the first zone are received from a management system and updating the first zone with the updated characteristics received from the management system. Upon the specific mobile device being located outside the updated first zone for longer than a predetermined time period, one or more first actions including an alert action are performed. Upon the specific mobile device returning to the first zone, one or more second actions including disabling the alert action are performed.

BRIEF DESCRIPTION OF THE SEVERAL VIEWS OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1:
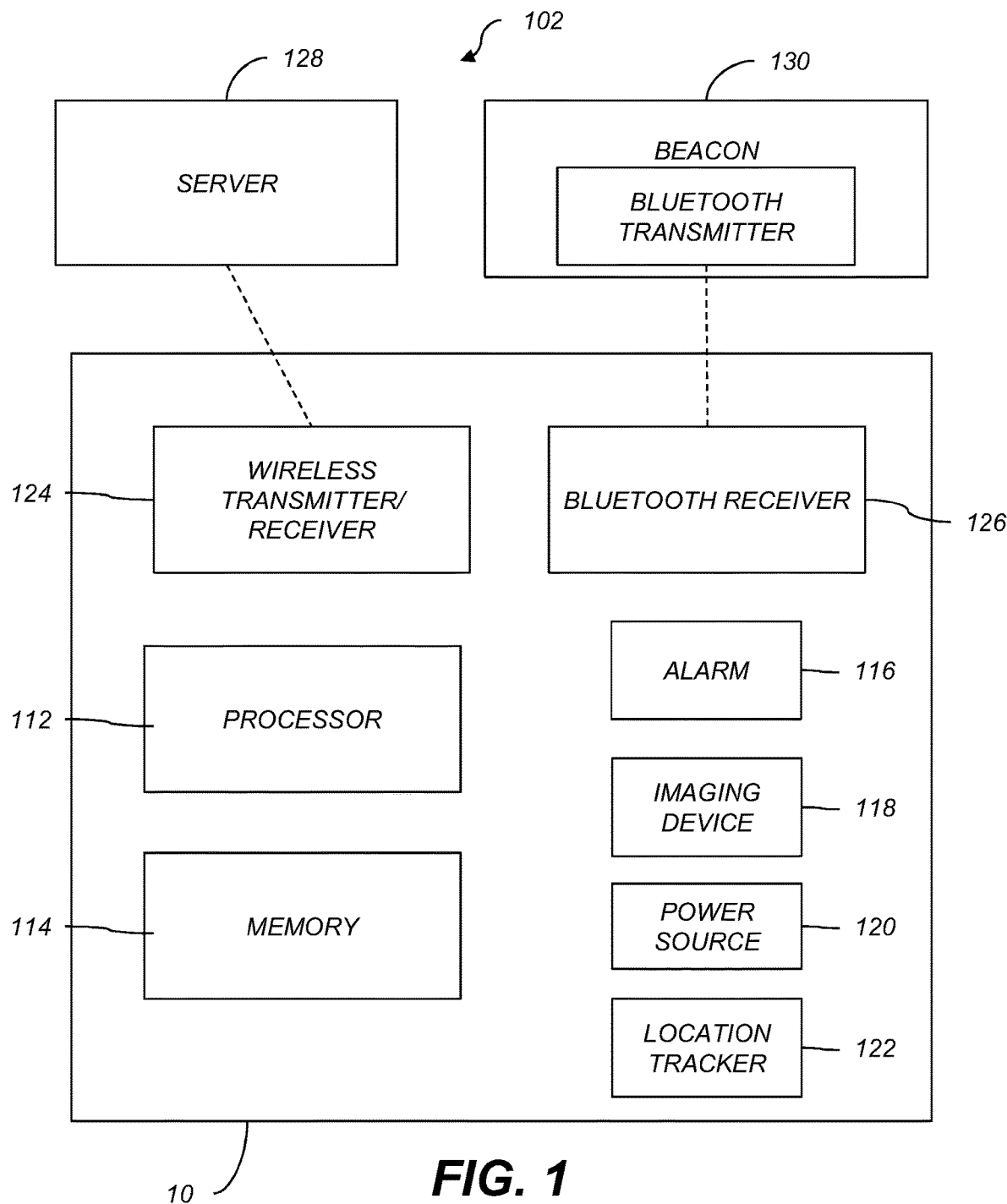
FIG. 1 is a high-level diagram showing the components of an embodiment of a system for managing mobile devices.

FIG. 1 is a high-level diagram of a mobile device security system 102. The system 102 includes a mobile device 10, such as a cellular phone or tablet, among others. While the system 102 is illustrated as including a single mobile device 10, it is to be understood that the security system 102 can include a plurality of mobile devices 10. In an embodiment, the mobile device 10 is a display model for a retail store. The mobile device 10 includes a processor 112 and memory 114. The memory 114 can be any suitable type of memory.

In addition, the mobile device 10 can include an imaging device 118. The imaging device 118 can be any suitable type of device including a still-shot camera, a video camera, or a combination thereof. The mobile device 10 can include a front-facing imaging device, a rear-facing imaging device, or a combination thereof.

The mobile device 10 includes a power source 120, such as a battery. For example, the power source 120 can be a lithium-ion battery. The power source 120 can be recharged via a charging cable coupled to an interface port (not shown) of the mobile device 10.

In addition, the mobile device 10 includes an alarm 116. The alarm 116 can be any suitable type of alarm. For example, the alarm can be an audible alarm, a visual alarm, or a combination thereof. In addition, the alarm 116 can be activated for a variety of reasons, as will be further discussed below. In an example, the alarm 116 can include different levels, such as different tones or different colors, depending on the reason the alarm 116 was activated. The alarm 116 can be activated when the mobile device 10 enters an alarm mode (also known as an alert mode). In addition, the alarm 16 can be activated when a charging cable is disconnected from the power source 120. In an example, when the alarm 116 is activated due to disconnection of the charging cable, the alarm can be deactivated by use of a password or passcode. In an embodiment, when the alarm 116 is deactivated by use of a passcode, only the sound is disabled, while the mobile device 10 is still monitored.

The mobile device 10 can include a location tracker 122. The location tracker 122 can be used to locate the mobile device 10. In an example, the location tracker 122 is a global positioning system (GPS) device.

The mobile device 10 further includes a wireless transmitter/receiver 124 and a Bluetooth receiver 126. In an embodiment, the wireless transmitter/receiver 124 can receive and transmit data via a WiFi connection or a cellular network. In an embodiment, the Bluetooth receiver 126 can both receive and transmit signals via a Bluetooth connection. In other embodiments, receiver 126 and wireless transmitter/receiver 124 may be a single radiofrequency subsystem, or may be a software based radio subsystem operating on the processor 112.

The system 2 may additionally includes a server 128. In an embodiment, the server 128 is a security server. The server 128 receives data from the mobile device 10 via the wireless transmitter/receiver 124 or device data service. For example, the mobile device 10 can transmit the current device status, images, alarm data, and location information, among others, to the server 128. In addition, the mobile device 10 can transmit a record of people enabling the alarm 116 or disabling the alarm 116. For example, the mobile device 10 can transmit identifying information, such as a passcode or sign-in information, as well as image data to the server 128. The server 128 can maintain a record of when and who enabled or disabled the alarm 116. In an embodiment, the server 128 can correlate data records with image records. In addition, the server 128 can maintain a record of the cause of each alarm activation.

The server 128 can monitor the mobile device 10. For example, the mobile device 10 can send regular signals to the server 128. When a signal is not received in the server 128, the server 128 can send a signal or ping the mobile device 10 to test responsiveness of the mobile device 10. If the mobile device 10 does not response, the server 128 can create an alarm or notification.

The system 2 further includes a beacon 130 having a Bluetooth transmitter 132. In another embodiment, the beacon 130 is any radiofrequency transceiver, including near field communications, WiFi, cellular communication, etc. The beacon 130 sends a signal, via the Bluetooth transmitter 132, to the Bluetooth receiver 126 of the mobile device 10. In another embodiment, the receiver 126 is any radiofrequency transceiver, including near field communications, WiFi, cellular communication, etc. The beacon 130 can be placed in a fixed location and, in an embodiment, when the signal is not received in the Bluetooth receiver 126, such as when the mobile device 10 is beyond the range of the Bluetooth transmitter 132, the alarm 116 can be activated. In another embodiment, the alarm 116 can be activated when the mobile device 10 is moved into range of the Bluetooth transmitter 132 and a Bluetooth signal is received by the Bluetooth receiver 126. In another embodiment, the beacon 130 can push notifications to the mobile device 10, such as advertisements, via the Bluetooth transmitter 132.

While the beacon 130 is described above as having a Bluetooth transmitter 132, the transmitter 132 can transmit any suitable type of wireless signal, such as a WiFi signal or radio frequency signal. In addition, while the beacon 130 is described as a discrete device, it is to be understood that the functionality of the beacon 130 can be included in existing devices. For example, the beacon 130 can be a wireless router that transmits a wireless or RF signal in addition to the typical operation of a wireless router. Similarly, the Bluetooth receiver 126 of the mobile device 10 can be configured to receive any suitable type of signal in accordance with the signal transmitted by the transmitter 132 of the beacon 130.

Figure 2:
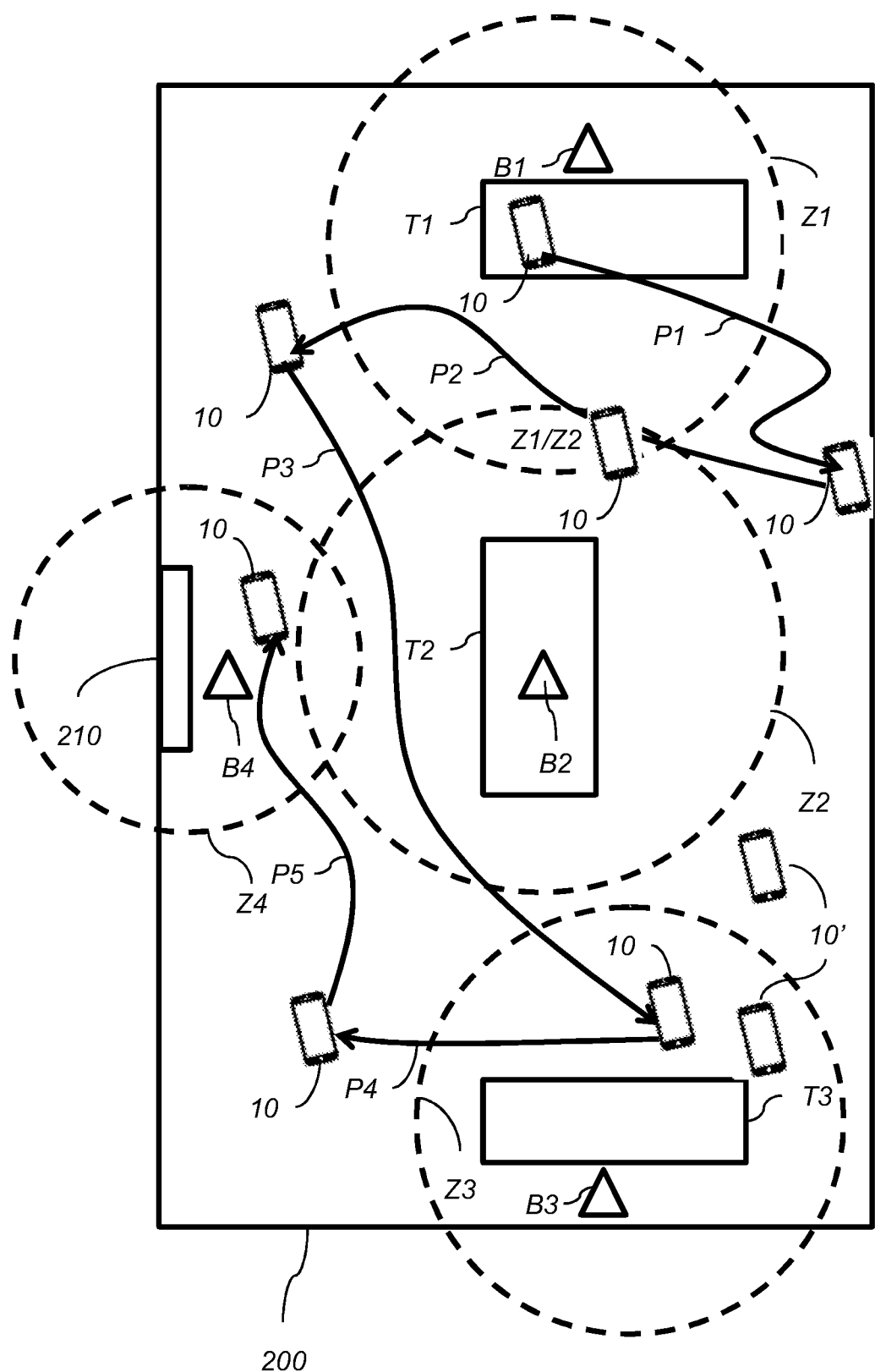
FIG. 2 is an illustration of a monitoring area for the system of FIG. 1, in accordance with one or more aspects set forth herein.
Figure 3:
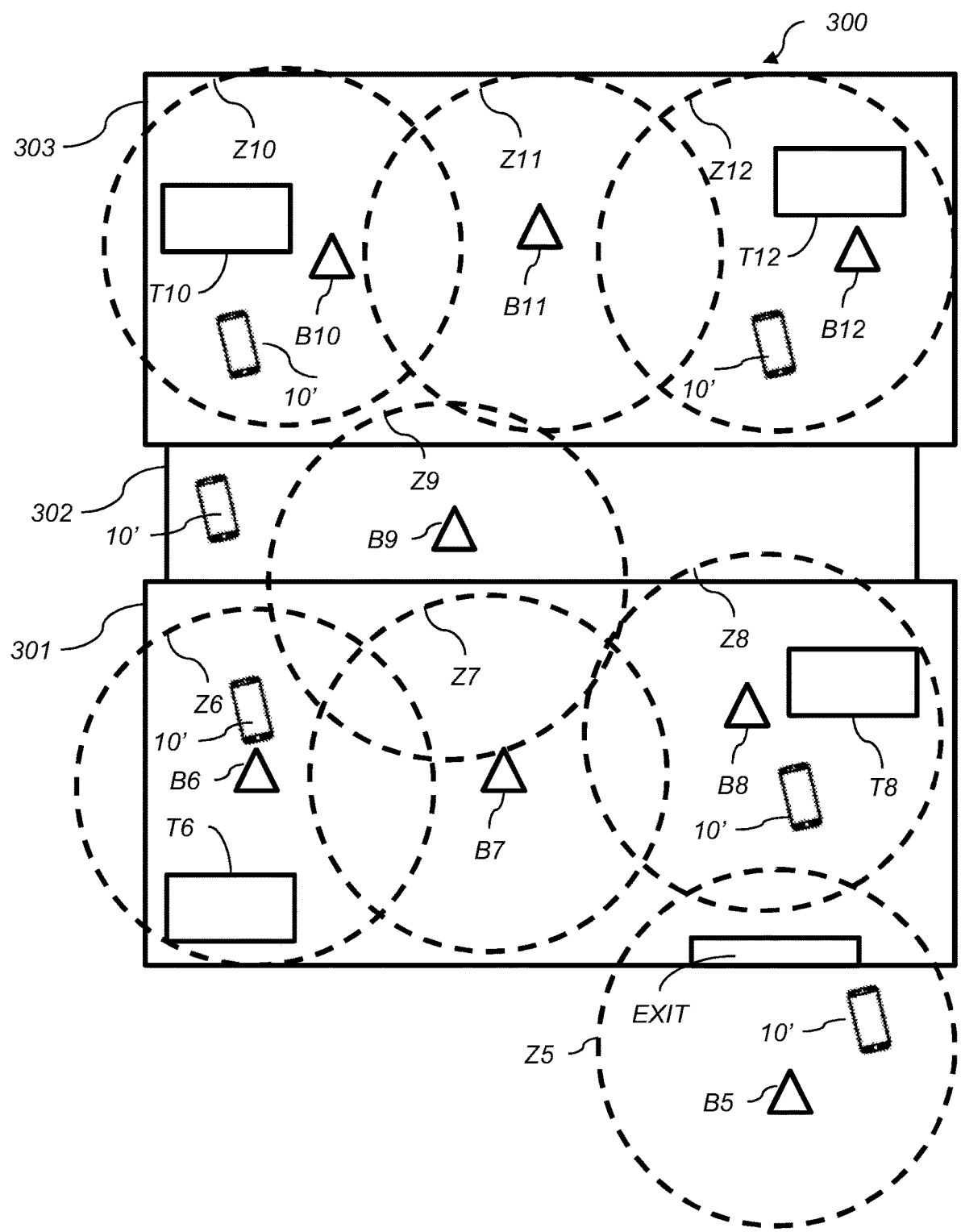
FIG. 3 is an illustration of a monitoring area within a multi-floor building for the system of FIG. 1, in accordance with one or more aspects set forth herein.

The beacon 130 includes a power source (not shown), such as a battery. In an embodiment, the battery has an average life of five (5) years. In an embodiment, the battery life of the beacon can be monitored to ensure timely replacement of the beacon battery. In FIGS. 2 and 3 to follow, different instances of the beacon 130 are labeled as the letter B followed by a number, for ease of understanding.

FIG. 2 is an illustration of a monitoring area 200. The monitoring area 200 includes a single exit 210 for either entering of exiting the monitoring area 200. By way of example, the monitoring area 200 may represent a retail store, a stock trading floor, a library, a secured facility, a business enterprise, or any other location in which monitoring of mobile devices is desired. Although the monitoring area 200 may represent a variety of different usage models, in order to provide clarity, the examples set forth below will be stated from the point of view of a retail store, and it will be understood that such a description for clarity only will not limit the scope of the disclosure.

Continuing with the embodiment of FIG. 2, the monitoring area 200 includes three tables T1-T3, which may be used to display different models of mobile devices, such as a plurality of devices 10', including one specific device 10 as described in detail in FIG. 1. In the retail store example, different brands or different models of devices from the same brand may be placed on the tables T1-T3 for consumer interaction. In the library example, the tables may be used to hold devices, such as eBook readers, for reading about different topics.

Advantageously, the techniques described herein allow consumer interaction with the devices 10, 10', without requiring a tether or attached monitoring component. Instead, as explained in further detail with respect to FIG. 4A, each of the devices 10, 10' includes an application (commonly referred to as an "app") which provides mobile device management, including security monitoring. Each of the devices 10, 10' includes a radiofrequency receiver, such as a Bluetooth receiver 126 (see FIG. 1).

Adjacently disposed to the tables T1-T3 are beacons B1-B3, respectively. Each of the beacons B1-B3 include wireless transmission capabilities for sending a signal that is present within a corresponding zone Z1-Z3, respectively. In addition, the exit 210 also includes an adjacently disposed beacon B4, which establishes a corresponding zone Z4. Signals from the beacons B1-B4 may be received and processed by the devices 10, 10'.

The beacons B1-B4 may be Bluetooth low energy beacons, such as Estimote beacons, including Estimote location beacons or Estimote proximity beacons, available from Estimote, Inc., of New York, N.Y. In another example, the beacons B1-B4 may be purpose-built beacons that include any suitable radiofrequency technology, such as WiFi, CDMA, etc., for sending a configurable signal that can define a zone, either through signal strength, data information, etc. The beacons B1-B4 send a specific signal that has a specific signal strength, and based on either the signal itself, the signal strength, the presence of a signal, or the lack of a detectable signal, or a combination of any of these factors, the zones Z1-Z4 may be established. In yet another example, the beacon itself may include multiple beam forming antennas that are programmable to create a non-symmetric zone. In addition, the actual zone created may be dependent on the presence of walls and materials within the monitoring area 200.

In operation, the beacons B1-B4 are deployed near the tables T1-T3 and the exit 210, respectively. In one example, an individual beacon, such as the beacon B2 may be deployed on the table T2 to establish the zone Z2 that includes the table T2 and surrounding floor space within the monitoring area 200. In another example, the beacon, such as the beacon B4 may be deployed in or near the ceiling of the building that houses the monitoring area 200, and more specifically in the ceiling above the area of the exit 210, to establish the zone Z4. In other examples, a specific beacon may be deployed inside a hidden ceiling or wall panel, inside a display case, in a locked office or closet, etc. Beacon deployment tools, such as beacon receiving software operational on a mobile device such as the devices 10, 10' can be used to show the signal strength of a beacon as an installer walks around the monitoring area 200.

Although the zones Z1-Z4 are depicted as circles, these zones may be of any conceivable shape, as noted above, due either to intrinsic characteristics of the monitoring area, such as walls and ceilings, etc., or due to configuration of the beacons to enable beam forming antennas, etc.

Thus, the monitoring area 200 allows for multiple zones Z1-Z4, which may be overlapping or non-overlapping, to be established using the beacons B1-B4. The device 10, which has been configured with a monitoring application, then receives the beacon signals from the beacons B1-B4 as the device 10 moves about the monitoring area 200. The beacon signals may be received using the radiofrequency transceiver, such as the Bluetooth receiver 126 (FIG. 1) of the device 10. The monitoring application of the mobile device 10 may optionally communicate with a server if desired, or may allow for a self-contained monitoring system without a server. Each deployment alternative has advantages, with a server-based model including the ability to have a centralized point from which to inventory and monitor all mobile devices, and the client-only device model including the simplicity of deployment afforded by a serverless installation.

As depicted in FIG. 2, the device 10 may follow a path through the monitoring area, for example when picked up and used by a consumer in the retail store example. In such a case, in the illustrated example, the device 10 initially is present on the table T1. Next, the device 10 follows the path P1 to a location that is not within any of the zones Z1-Z4. Next, the device 10 follows the path P2 to a location that is within both Z1 and Z2, then to through zone Z1, and to a location that is not within any of the zones Z1-Z4. Next, the device 10 follows the path P3 through zone Z2 and into zone Z3. Next the device 10 follows the path P4 from the zone Z3 to a location that is not within any of the zones Z1-Z4, ending up in the zone Z4, near the exit 210.

As the device 10 traverses the paths P1-P5 within the monitoring area 200, the device 10 continues to receive signals from the beacons B1-B5. Upon receiving the signals from the beacons B1-B5, the device 10 may determine entry and/or exit of zones, and may perform zone-specific entry and/or exit functionality, as described in detail with respect to FIGS. 4A-4F, below.

Before turning to an example of the behavior of the device 10 as it traverses the paths P1-P5 within the monitoring area 200, another example of a monitoring area 300 is set forth in FIG. 3.

As depicted in FIG. 3, the monitoring area 300 includes a first-floor monitoring area 301, a stairwell monitoring area 302 and a second-floor monitoring area 303. Deployed within the monitoring area 300 are eight beacons B5-B12 which are used to establish zones Z5-Z12 in a manner similar to that described above with respect to FIG. 2. Continuing with the example of FIG. 3, six different mobile devices 10' are depicted in five zones Z5, Z6, Z8, Z10 and Z12, and in the stairwell monitoring area 302 outside of any of zones Z5-Z12. Further, the monitoring area 300 includes four tables T6, T8, T10 and T12. As shown in the example deployment of FIG. 3, the monitoring system may include numerous beacons, such as the beacons B5, B7, B9 and B11 (i.e., in the odd numbered zones) which are not affiliated with a table. Thus, the technique described herein does not rely on a one-to-one correspondence of elements, and specifically tailored systems may be made with an infinite number of variations, all of which are within the scope of the present disclosure.

Next, to illustrate the system and method set forth herein, FIGS. 4A-4F set forth detailed flow diagrams of a method 400 for providing security to the mobile device 10 of FIG. 2. Each of FIGS. 4A-4E includes four interconnected flow charts from the points of view of the mobile device 10, the beacon B1, the beacon B2 and the server S, with vertical flows representing actions within each of those four elements, and horizontal flows representing actions between two or more of those four elements.

Figure 4A:
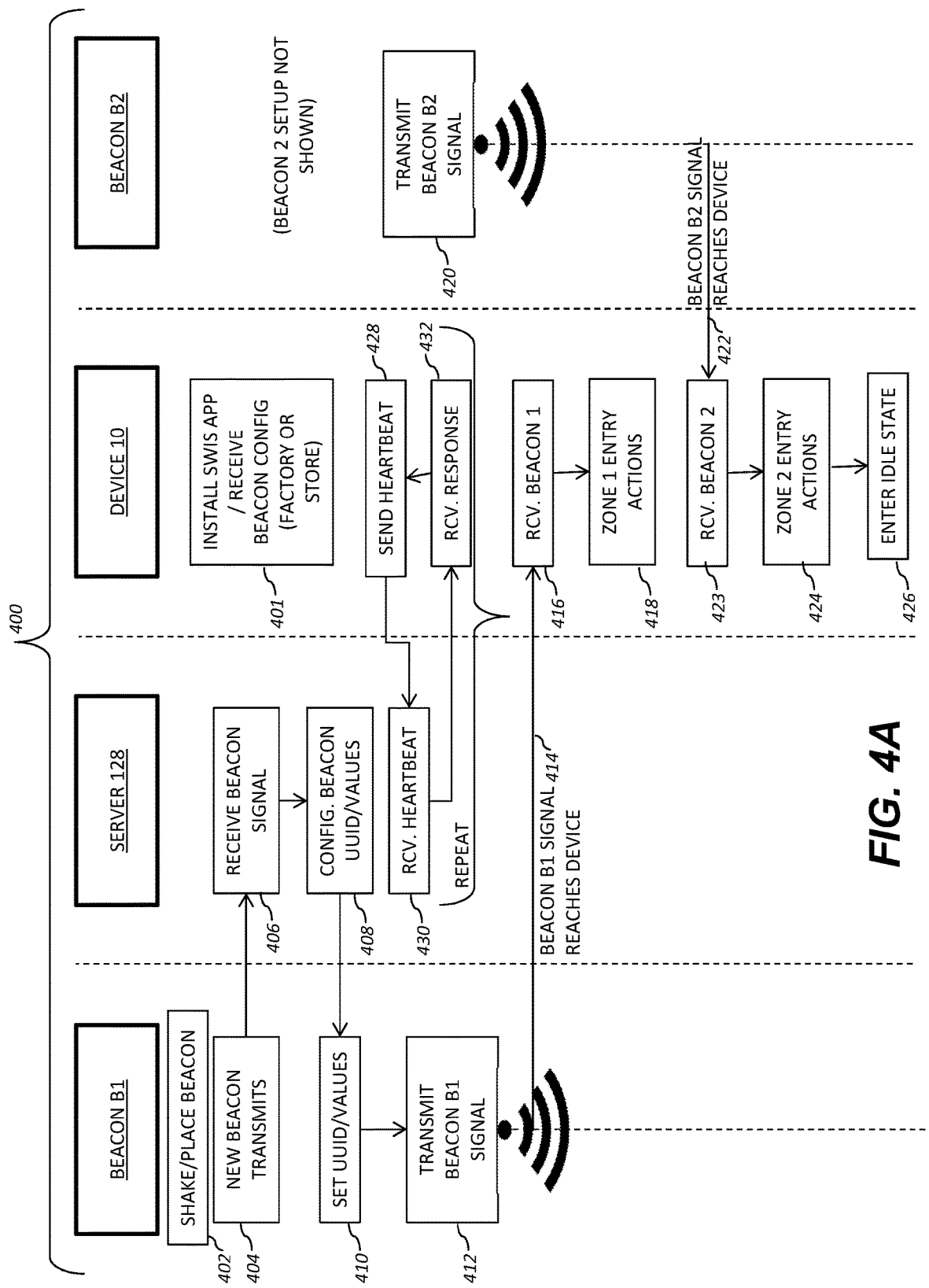
FIGS. 4A-4F are flow diagrams of a method of providing security to a mobile device, in accordance with one or more aspects set forth herein.

Beginning first with FIG. 4A, beacons B1, B2 may be installed within a monitoring area, such as the monitoring area 200 (FIG. 2) or the monitoring area 300 (FIG. 3). An application, at block 401, may be installed on the device 10, either at the factory or at the monitoring area as devices are put out for display.

Continuing, at block 402 of the method 400, the beacon B1 may be activated by being shaken and then put in place in the monitoring area. The beacon B1 can include motion detection features that allow the beacon to wake up upon shaking Next, at block 404, the beacon B1 transmits a beacon B1 signal (e.g., within the zone Z1 of FIG. 2).

In one example, in which a server is used for management and monitoring, the server 128 at block 406 receives the beacon B1 signal. Next, the server 128 at block 408 configures the beacon B1 with a universally unique identifier (UUID) and other values to instruct the beacon B1 as to what distance, direction, and or shape of signal to transmit so that the zone created by the beacon B1 has the desired characteristics for a given monitoring area. As noted above, the beacon B1 and the server 128 may communicate using any suitable radiofrequency methodology, including for example Bluetooth low energy.

In another "server-less" example, the mobile device itself will configure the beacons. For example, the mobile device application that is loaded onto the mobile device (e.g., at the factory or at a store) may include certain configuration features that allow the beacons to be configured when a beacon configuration mode is entered. Advantageously, this "server-less" mode of operation allows for the system to be comprised only of mobile devices and beacons, and eliminates the cost, ongoing management expense, and complexity of a server-based deployment. A person of ordinary skill in the art will readily understand that any of the features recited below that use a server could instead be deployed on one or more mobile devices when the system is operated in a "server-less" mode.

Next, the beacon B1 at block 410 receives the UUID and other values, and reconfigures itself so that the beacon B1 at block 412 may transmit the beacon B1 signal with the appropriate UUID and in the appropriate footprint/characteristics as configured by the server. In one example, the server 128 may not ever again configure the beacon B1. In another example, the server 128 may periodically check the beacon B1, or may reconfigure the beacon B1 on a periodic basis, such as each day at startup, upon system configuration changes entered by a system operator, etc.

Continuing, at block 414 the beacon B1 signal reaches the device 10 due to the location of the device 10 within the monitoring area based on the signal configuration of the beacon B1. In the embodiment of FIG. 4A, the device 10 at block 416 receives the beacon B1 signal and then at block 418 performs zone 1 entry actions.

In one example, the monitoring application on the device 10 may deem that zone 1 is its home zone, and the device 10 may allow normal operation of the device 10 by a user, while the monitoring application recedes into the background so as not to impede the users interaction with the device 10.

Still with respect to FIG. 4A, reference is made to the beacon B2. Setup of the beacon B2 is not shown in detail, as the setup would be similar to the operations previously described with respect to the beacon B1, except that different UUID and values may be used so that the beacon B2 can support a different zone, such as the zone Z2. The beacon B2 at block 420 transmits the beacon B2 signal within the monitoring area, and specifically within the zone Z2. At block 422, the beacon B2 signal reaches the device 10. The device 10 at block 423 receives the beacon B2 signal, and at block 424 performs zone 2 entry actions.

In one example, the device 10 may deem itself to be in both zones Z1 and Z2 at the same time due to receiving both of the beacon B1 and beacon B2 signals within a short timeframe. In another example, the device 10 may take note of the zone Z2 entry and switch the user interface of the device to a different foreground application or message, or may perform any other action, such as locking out some device applications but not others depending on the zone that has been entered. In one specific security application, the camera may be disabled upon entry or exit to a specific zone that may include secret information that is not to be photographed. In another example, zone specific actions may disable access to non-secure internet subnets.

Next, the device 10 at block 426 enters the idle state, in which the device 10 is present in the same zone, and allows whatever access to the device by the user as has been indicated in the zone specific logic stored within the monitoring application. Again, the monitoring application may continue to run in the background to detect zone exits and entries so that appropriate action may be taken.

In an embodiment that employs heartbeat monitoring, the device 10 at block 428 sends a heartbeat message to the server 128. The server 128 at block 430 receives the heartbeat and at block 432 sends a heartbeat response to the device 10. For example, the device 10 and server 128 may communicate using cellular communication technology, WiFi technology, or Bluetooth technology. So long as the heartbeat signals are sent and received, each of the server 128 and the device 10 can consider that no alarm state exists.

Figure 4B:
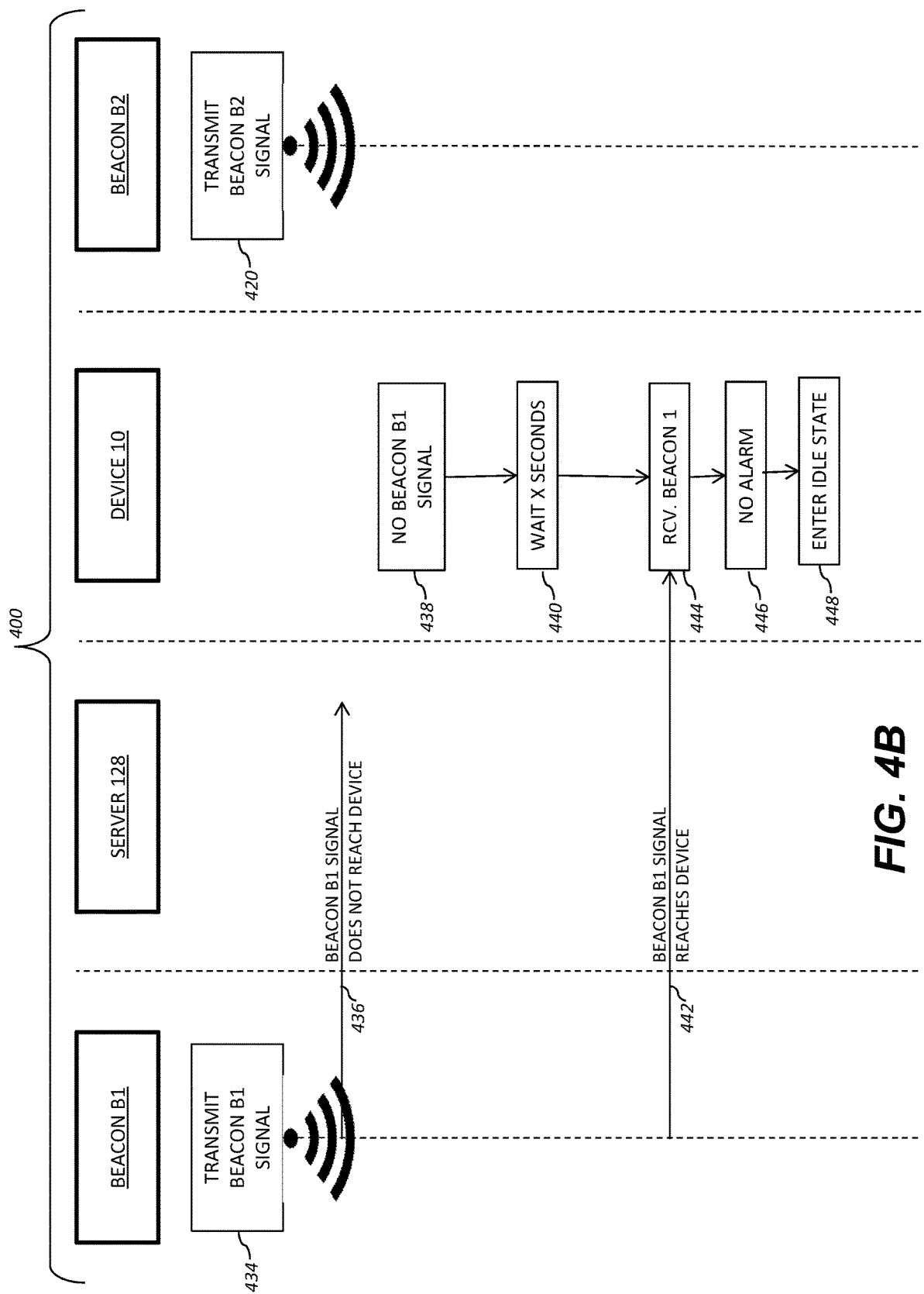

Turning next to FIG. 4B which depicts beacon loss without alarm according to the method 400, the beacon B1 first at block 434 transmits the beacon B1 signal. At block 436, the beacon B1 signal does not reach device 10. The device 10 at block 438 determines that no beacon B1 signal has been received, and at block 440 waits X seconds to attempt to reacquire the beacon B1 signal, where X may be between 1 and 20 seconds or so, and can enter an alarm state if the signal has not arrived in that time. Next, at block 442, the beacon B1 signal reaches the device 10. The mobile device 10 at block 444 receives the beacon B1 signal, and at block 446 determines that the no alarm state is required, because the beacon B1 signal was only unavailable for a relatively short duration. Thereafter, the mobile device 10 at block 448 enters the idle state.

Figure 4C:
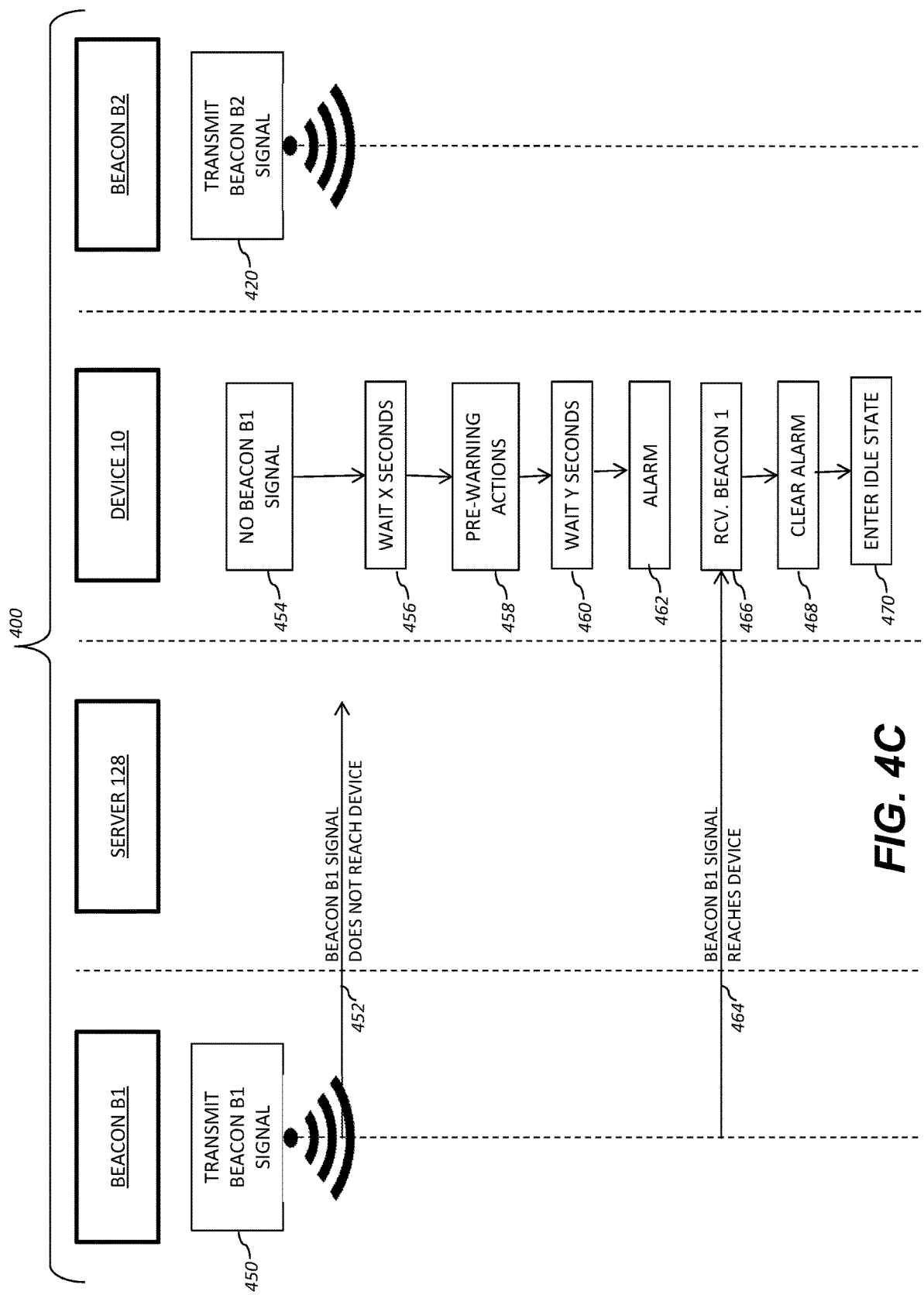

Continuing, FIG. 4C depicts an alarm state that is subsequently cleared by the method 400. First, the beacon B1 at block 450 transmits the beacon B1 signal. At block 452, the beacon B1 signal does not reach device 10. The device 10 at block 454 determines that no beacon B1 signal has been received, and at block 456 waits X seconds to attempt to reacquire the beacon B1 signal, where X may be between 1 and 20 seconds or so. By contrast with the example of FIG. 4B, once the time has elapsed, the mobile device 10 at block 458 initiates pre-warning actions. For example, the mobile device 10 may display on its user interface a warning to the user to move back into zone Z1, or may start beeping or chirping. In another example, the mobile device 10 may send a warning message to the server 128.

After the pre-warning actions at block 458, the mobile device 10 at block 460 waits another time period of Y seconds to allow the user to take heed of the pre-warning and return to the zone Z1 or take any other appropriate action as indicated previously, where Y may be between 1 and 20 seconds. If the user fails to move back into the zone Z1, or fails to reach any other zone, the mobile device 10 at block 462 initiates a full alarm or alert mode. The alarm mode or alert mode can include the performance of one or more alert actions or alarm actions, which may be denoted by severity levels, such as red-alert, yellow-alert, caution-alert, etc. As explained further with respect to FIG. 4F, the full alarm mode could include any or all of the mobile device 10 emitting a loud siren, the mobile device 10 taking pictures, the mobile device 10 uploading information to the server 128 to alert security personnel, the mobile device 10 sending global positional system (GPS) coordinate to a server 128, the mobile device 10 locking and calling for help over the telephone subsystem, etc. In another embodiment, the pre-warning actions may include any of the following actions: check for beacon loss; check for beacon region; look for beacons in range; determine if the device 10 is in a danger zone (as established, e.g., by a beacon at the exit); check if the device 10 is in motion, e.g., using a gyroscope; check if the device 10 is charging or not charging; check for GPS location. Advantageously, all of these pre-warning actions may be complete within approximately 2-3 seconds.

Next, at block 464 the beacon B1 signal reaches the mobile device 10. In such a case, the mobile device 10 at block 466 can receive the beacon B1 signal, and at block 468 can clear the alarm state and return to the idle state at block 470.

Figure 4D:
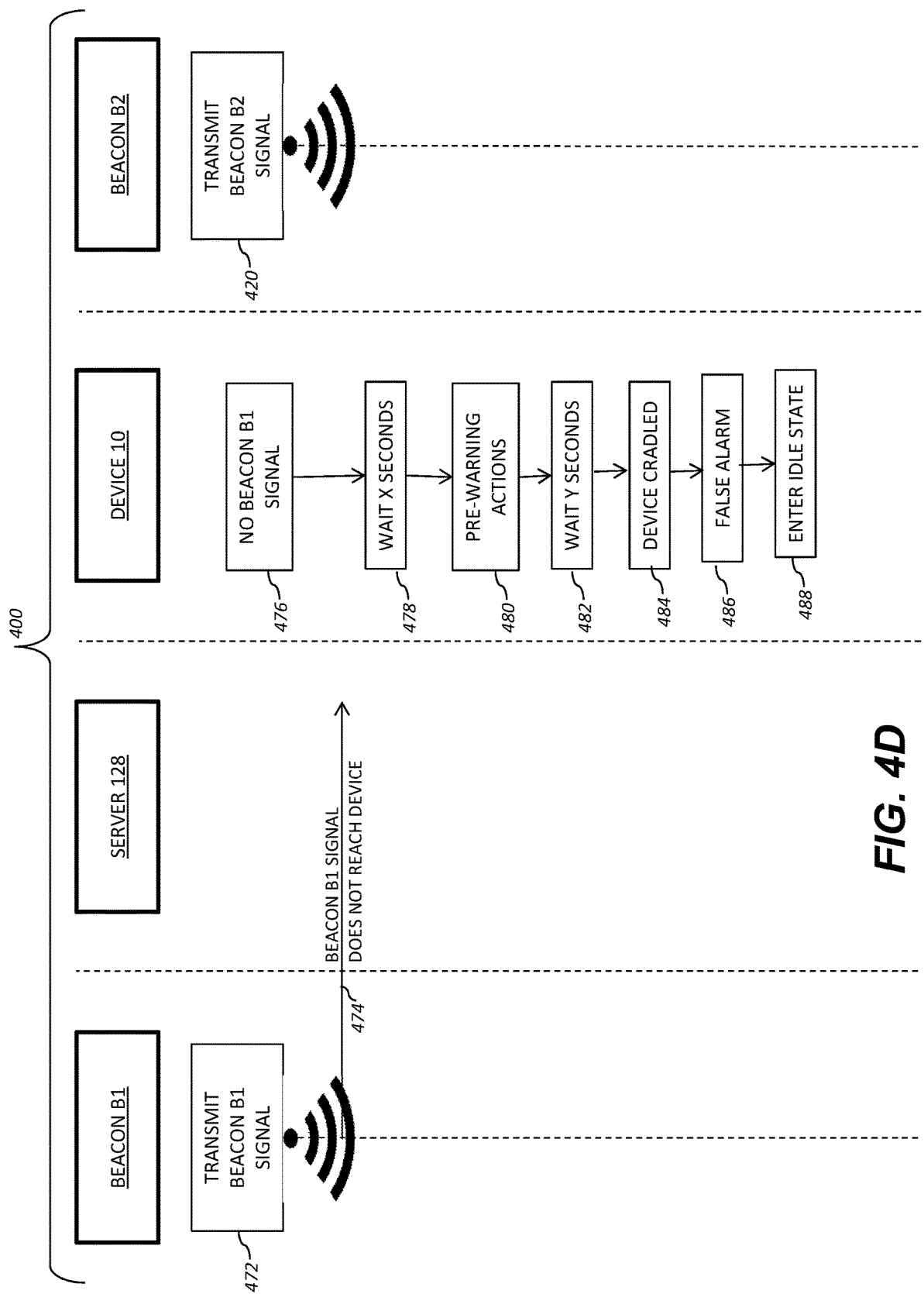

FIG. 4D depicts an example in which the method 400 clears an alarm upon being cradled. For instance, the beacon B1 transmits the beacon B1 signal at block 472, but at block 474 the signal does not reach the mobile device 10. The device 10 at block 476 determines that no beacon B1 signal has been received, and at block 478 waits X seconds to attempt to reacquire the beacon B1 signal, where X may be between 1 and 20 seconds or so. By contrast with the example of FIG. 4B but similarly to the example of FIG. 4C, once the time has elapsed, the mobile device 10 at block 480 initiates pre-warning actions. For example, the mobile device 10 may display on its user interface a warning to the user to move back into zone Z1, or may start beeping or chirping. After the pre-warning actions at block 480, the mobile device 10 at block 482 waits another time period of Y seconds to allow the user to take heed of the pre-warning and return to the zone Z1 or take any other appropriate action as indicated previously, where Y may be between 1 and 20 seconds. In this example, the mobile device 10 at block 484 is cradled in a home cradle, for example at table T1 of FIG. 2. In such a case, the mobile device 10 at block 486 indicates a false alarm and at block 488 enters the idle state.

Of course, in another example, a third or fourth or more set of time intervals may be employed to provide more granular warnings to the user. Any of the actions ascribed herein to the alarm or pre-alarm states could be subdivided into three, four or more warning levels that the mobile device 10 escalates into as the time elapses. In addition, although depicted above the device 10 has returned to a cradle, the alarm state could be ended by the device 10 receiving a signal from any other beacon B2-B12. Conversely, if the device 10 receives a signal from a beacon B5 (FIG. 2) that is placed about an exit, the device 10 can immediately enter the alarm state.

Figure 4E:
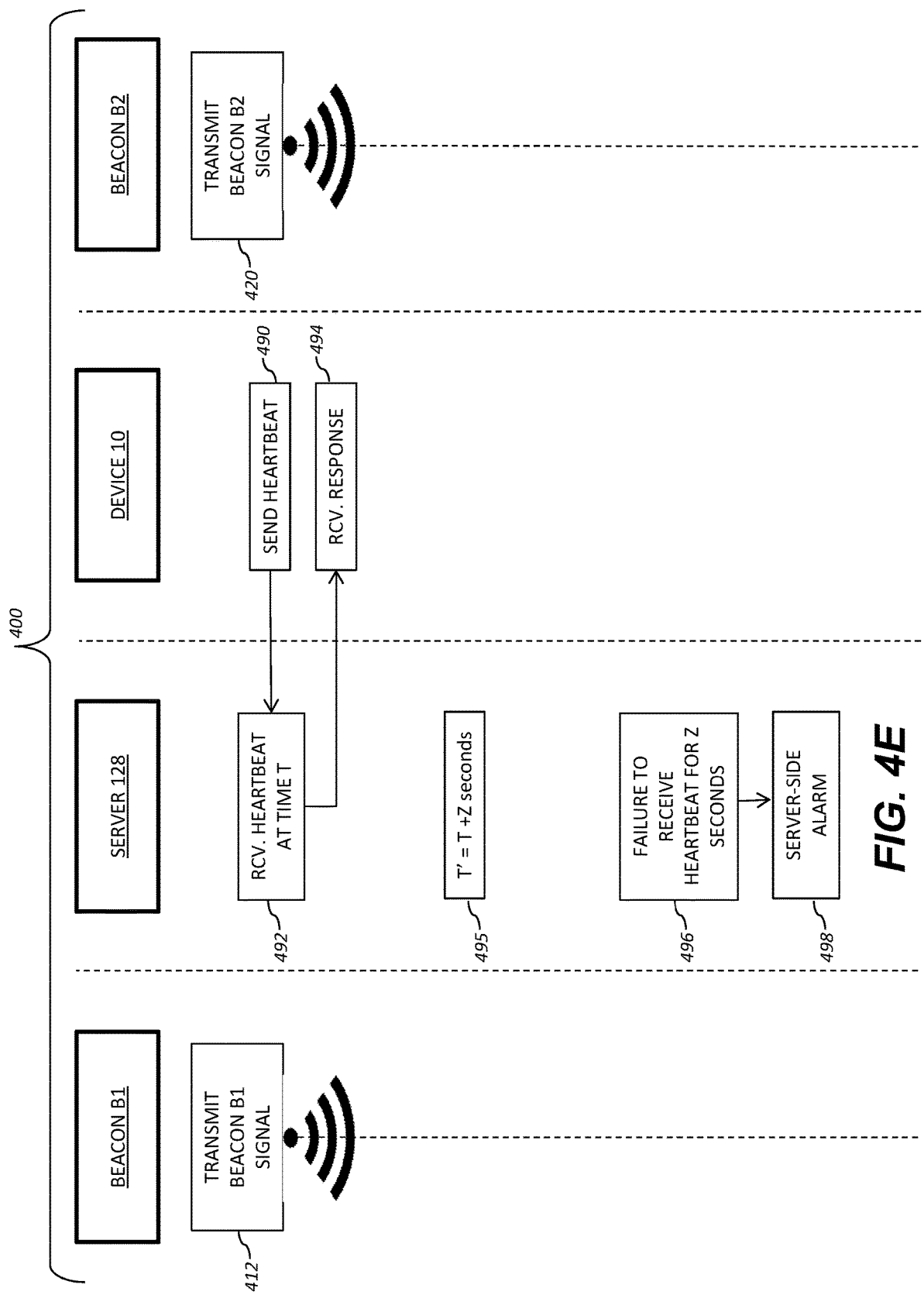

Turning next to FIG. 4E, the method 400 includes server side heartbeat alarms. For instance, the device 10 at block 490 sends a heartbeat message to the server 128. The server 128 at block 492 receives the heartbeat at time T and at block 494 sends a heartbeat response to the device 10. However, if by the time T+Z at block 495, the server 128 at block 496 fails to receive another heartbeat signal from the device 10, the server 128 at block 498 can initiate a server-side alarm. The server side alarm can alert security personnel in the monitoring area that the device 10 has disappeared, and appropriate action can be taken. For example, the server 128 can initiate a wipe of the device, etc. In another example, the server 128 can also be a usage management server, and can receive application usage information from the mobile device 10, so that the overall usage information can be tracked for advertising or other commercial purposes.

Figure 4F:
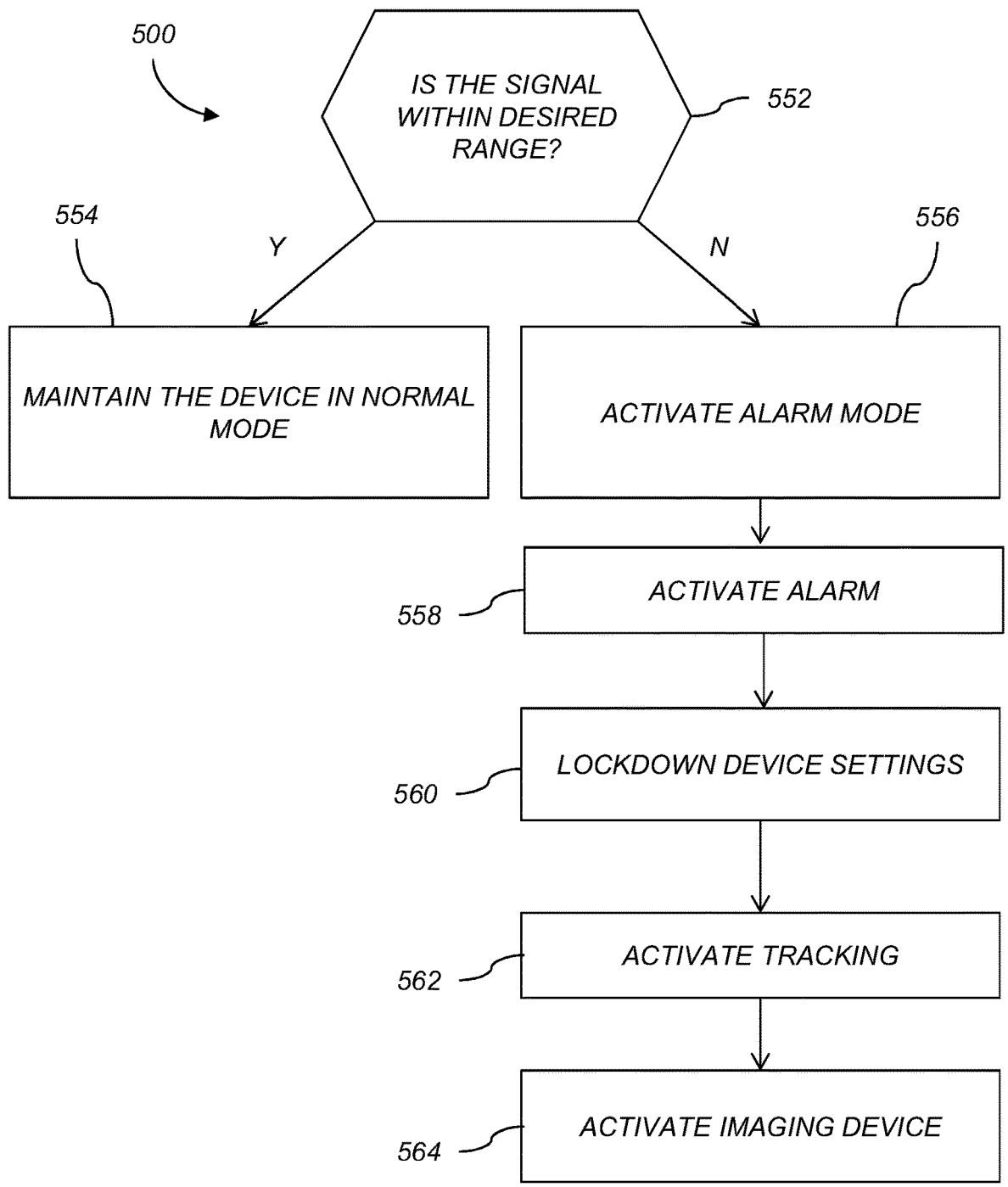

FIG. 4F is a flow diagram illustrating additional details of the alarming techniques. The method 500 can be invoked, for example, at block 462 of FIG. 4C and/or block 498 of FIG. 4E, or the particular steps can be invoked in different orders during the pre-alarm state of block 458, etc. The method 500 begins at block 552 with the processor 12 (see FIG. 1) determining if a Bluetooth signal from the beacon, e.g., beacon B1, is within a desired range. For example, the processor 12 can determine if a Bluetooth signal from the beacons is received in the Bluetooth receiver 26 of the mobile device 10. If the processor 12 determines the Bluetooth signal is within range, such as when the mobile device 10 is within the zone Z1 (FIG. 2), which may be denoted as a comfort zone, the processor 12 maintains the device 10 within a normal operating mode. In an embodiment, the range of the beacon is adjustable. For example, the range of the beacon can be set by selecting a desired beacon signal strength, such as by selecting weak, medium, or long.

If the processor 12 determines a Bluetooth signal not within range, such as when the device enters zone Z2 (FIG. 2), which may be denoted as a caution zone, the processor 12 activates an alarm mode at block 556. When the device 10 transitions to the alarm mode, the alarm 16 of the mobile device 10 is activated. The alarm can have various trigger options. For example, in close proximity monitoring, the alarm 16 can be triggered when the device 10 is outside of a designated three to six foot radius. In another example, in large room monitoring, the alarm 16 can be triggered when the device 10 is beyond a fifty to seventy foot radius. As discussed above, the alarm 16 can be an audible alarm, visual alarm, or a combination thereof. In an embodiment, when the alarm 16 is activated during the alarm mode, the alarm 16 cannot be deactivated and the intensity of the alarm 16 cannot be lowered. For example, when the alarm 16 is an audible alarm, the volume of the alarm 16 cannot be lowered. The alarm issues directly from the mobile device 10, such as via a speaker at maximum volume. In an embodiment, when the alarm mode is activated, an alert email or message can be transmitted to a retail associate or manager. Notification of activation of the alarm mode is transmitted from the mobile device 10 to the server 128.

At block 560, the settings of the mobile device 10, such as the WiFi or cellular network settings, of the mobile device 10 are locked down to prevent the settings from being changed. Lockdown of these settings enables the mobile device 10 to continue to transmit data to the server 28 while the device 10 is in the alarm mode. Data can be monitored and the device data can be reset to factory settings. In addition, power button, device factory reset functionality, or program uninstall can be disabled to block device tampering and prevent the security measures from being removed from the device 10. In addition, an alarm screen can be activated to over-ride all activity of the device, rendering the device unusable. Furthermore, device proprietary information can be remotely deleted from the device 10. In addition, at block 560, the lockdown can include a lockdown of all buttons, and/or an activation lock so that the device is prevented from being activated or re-activated in the future.

At block 562, tracking of the mobile device 10 via the location tracker 22 is activated. In an embodiment, the location of each mobile device 10 is shown on a GPS map at all times, even when the device 10 is in a home location. In another embodiment, the location of a mobile device 10 is identified on a GPS map in response to activation of the alarm mode. Tracking of the device 10 via the location tracer 22 enables the device 10 to be retrieved in the event the device 10 is misplaced or stolen. In addition, a device inventory audit can be carried out without requiring a physical visit to each retail location. The data from the location tracker 22 can be transmitted to the server 28. In another embodiment, the location tracker 22 can emit a tracking signal that can be used, such as by authorities, to locate the device 10. In an alternative embodiment, the location of the beacon 30 and mobile device 10 is continually tracked or monitored, even when in a retail environment.

At block 564, the imaging device 18 is activated to gather image data. For example, the imaging device 18 can capture still shot or video data of a physical environment or a person holding the device. The image data can be transmitted to the server 28, from which the image data can be made accessible, such as to authorities. In another embodiment, an image of a person enabling or disabling an alarm can be captured and transmitted to the server 28.

It is to be understood that blocks of FIGS. 4A-4F can occur consecutively or nearly simultaneously. In addition, while the method above has been described in the context of a Bluetooth signal, other types of wireless signals, such as WiFi or radio frequency signals, could also be used.

In an alternative embodiment, not illustrated, the alarm mode can be activated when a Bluetooth signal is received. For example, a beacon can be placed in a fixed location, such as near an exit 210 (FIG. 2), and an alarm zone Z4 established around the beacon B4. In this embodiment, when the Bluetooth signal is not received, the mobile device 10 operation in a normal mode and when the Bluetooth signal is received, the alarm mode is activated.

In yet another alternative embodiment, a combination of security methods can be employed in which beacons are used to establish both comfort zones and alarm zones.

Although the techniques set forth herein have been described with respect to specific usages, the method may be used in any situation in which establishment of zones is desired. Thus, the specific example embodiments are meant only to explain the technique, not limit the technique.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for mobile device security of a mobile device, the mobile device comprising a global positioning system (GPS) tracker for locating the mobile device, and the method comprising:
   establishing a first zone and a second zone in a monitoring area, wherein the mobile device is maintained in a first operating mode when the mobile device is located in the first zone and a second operating mode when the mobile device is located in the second zone;
   receiving one or more characteristics of the first zone from a management system;
   upon the mobile device being located outside the first zone for longer than a predetermined time period, performing one or more first actions, the one or more first actions comprising a pre-warning action and an alert action; and
   upon the mobile device returning to the first zone, performing one or more second actions, the one or more second actions comprising disabling the alert action and entering an idle state.

2. The method of claim 1, wherein the one or more first actions comprise an alert action.

3. The method of claim 2, wherein the one or more second actions comprise disabling the alert action.

4. The method of claim 1, wherein the one or more characteristics of the first zone comprise a radius of the first zone.

5. The method of claim 1, wherein the second zone is defined as a region outside the first zone.

6. The method of claim 1, wherein the one or more characteristics of the first zone comprise a shape of the first zone.

7. The method of claim 1, wherein the mobile device security application is loaded on the mobile device by the management system.

8. The method of claim 1, wherein the management system comprises a map display to monitor locations of the mobile device.

9. The method of claim 1, wherein the method further comprises ending the second actions upon the mobile device re-entering the first zone.

10. The method of claim 1, wherein performing the second actions further comprises disabling a factory reset capability of the mobile device.

11. The method of claim 1, wherein performing the second actions further comprises disabling a power-off of the mobile device.

12. The method of claim 1, wherein the method further comprises activating, upon the mobile device leaving the first zone, one or more of a visible warning or an audible warning.

13. A method for mobile device security of a mobile device, the mobile device comprising a global positioning system (GPS) tracker for locating the mobile device, and the method comprising:
   establishing a first zone and a second zone in a monitoring area, wherein the mobile device is maintained in a first operating mode when the mobile device is located in the first zone and a second operating mode when the mobile device is located in the second zone;
   receiving one or more characteristics of the first zone from a management system, the one or more characteristics comprising a radius of the first zone;
   upon the mobile device being located outside the first zone for longer than a predetermined time period, performing one or more first actions including a pre-warning action and an alert action; and
   upon the mobile device returning to the first zone, performing one or more second actions including disabling the alert action and entering an idle state.

14. The method of claim 13, wherein the mobile device security application is loaded on the mobile device by the management system.

15. The method of claim 13, wherein the management system comprises a map display to monitor locations of the mobile device.

16. The method of claim 13, wherein the method further comprises ending the alert actions upon the mobile device re-entering the first zone.

17. A method for mobile device security of a plurality of mobile devices, each specific mobile device of the plurality of mobile devices comprising a global positioning system (GPS) tracker for locating the mobile device, and the method comprising:
   establishing a first zone with first characteristics and a second zone with second characteristics in a monitoring area, wherein the plurality of mobile devices are maintained in a first operating mode when the specific mobile device is located in the first zone and a second operating mode when the specific mobile device is located in the second zone;
   receiving one or more updated characteristics of the first zone from a management system and updating the first zone with the updated characteristics received from the management system;
   upon the specific mobile device being located outside the updated first zone for longer than a predetermined time period, performing one or more first actions including a pre-warning action and an alert action; and
   upon the specific mobile device returning to the first zone, performing one or more second actions including disabling the alert action and entering an idle state.

18. The method of claim 17, wherein the plurality of mobile devices comprises a first mobile device and a second mobile device, and the first zone is established based on a first radius about a first location of the first mobile device, and the first zone is updated based on a second radius about a second location of the second mobile device.

19. The method of claim 17, wherein the mobile device security application is loaded on the mobile device by the management system.

\* \* \* \* \*